July 28, 1959  C. W. SMITH ET AL  2,896,687
TIRE AND WHEEL ASSEMBLY
Filed Nov. 10, 1954  2 Sheets-Sheet 1
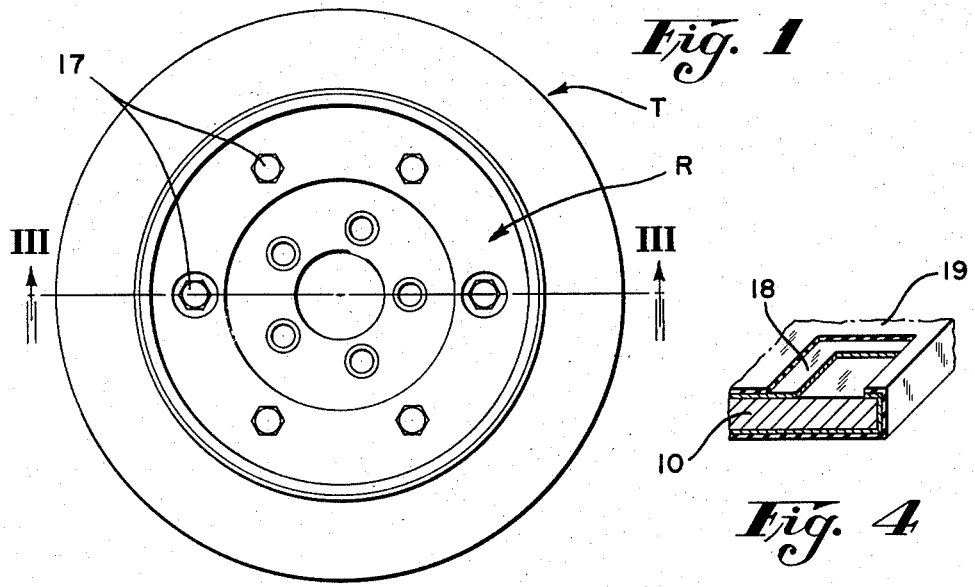
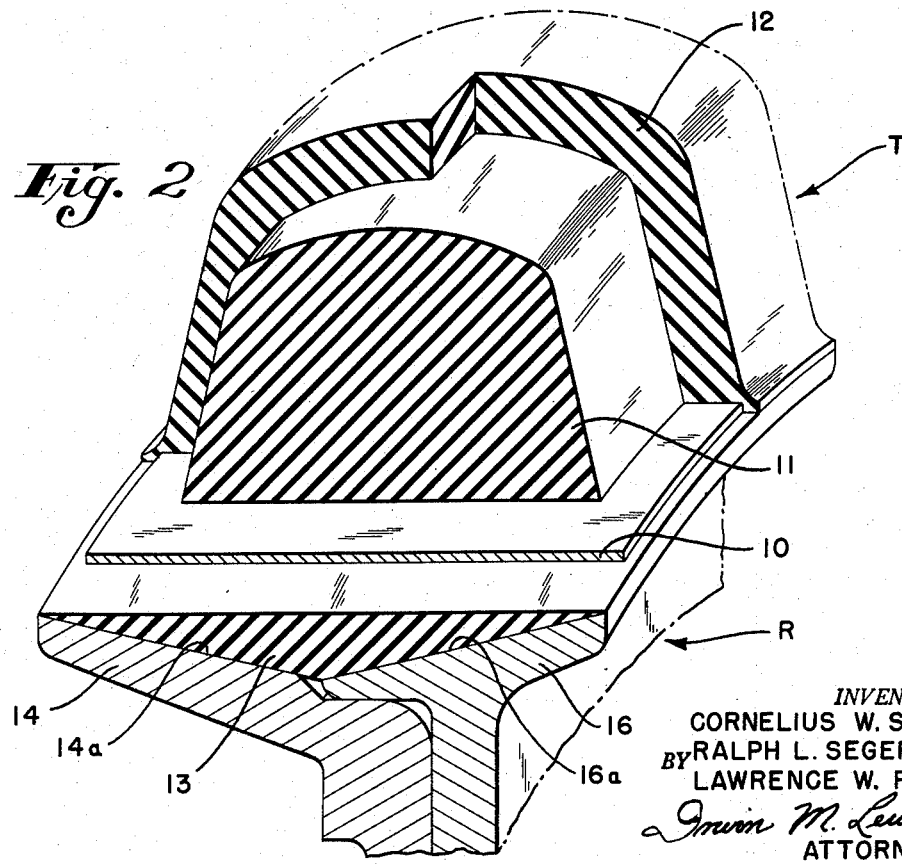
INVENTOR.
CORNELIUS W. SMITH
BY RALPH L. SEGER JR.
LAWRENCE W. ROREM
ATTORNEY.

United States Patent Office
2,896,687
Patented July 28, 1959

2,896,687

TIRE AND WHEEL ASSEMBLY

Cornelius W. Smith, Grosse Pointe, and Ralph L. Seger, Jr., and Lawrence W. Rorem, Detroit, Mich., assignors to United States Rubber Company, New York, N.Y., a corporation of New Jersey Application November 10, 1954, Serial No. 467,962

2 Claims. (Cl. 152—310)

This invention relates to a tire and rim assembly. More particularly, it relates to a tire of the solid or semi-pneumatic type and a rim of the split type having oppositely tapered flanges which engage the base of the tire and serve when clamped together to wedge the tire tightly thereon to prevent slippage between the tire and the rim.

Such tires commonly have incorporated therein circumferentially extending, substantially inextensible reinforcing elements which overlie a base of comparatively soft rubber. Such reinforcing elements prevent circumferential stretching of the tire under the influence of the wedging action of the tapered flanges so that the base of the tire tightly grips the tapered flanges of the rim.

Heretofore, such reinforcing elements have been in the form of spaced metal cables or bands, or in the form of a single perforated metal band. Such spacing of the cables or the provision of the perforations in the single band were considered necessary to provide for interflow during vulcanization of the stock forming the base and that forming the remaining portion of the tire to provide an integrated bond between the two stocks to prevent separation thereof.

In contrast to such teaching, we have found that such spacing of the reinforcing elements or the provision of such perforations, rather than lengthening the life of the tire, contribute to its early failure. This is due to the fact that such spacing or perforations provide passageways through which the rubber forming the base of the tire flows when force is applied thereto by the wedging action of the tapered flanges of the rim. The rubber being substantially incompressible, such flow is inherent and such flow past and between the reinforcing elements causes a breakdown of the bond between the reinforcing elements and the rubber forming the tire, thereby contributing to early failure of the tire. We have found that failure of a tire due to this phenomena is much more common than that occurring by reason of exterior torque load applied to the tire in use.

The primary object of the present invention is to provide a novel construction which will eliminate such undesirable flow of the base stock and failure of the tire caused thereby. To this end, the tire of the present invention differs from the tires heretofore proposed, in that the circumferential reinforcement is in the form of a solid metal band which extends substantially the full transverse width of the tapered base and overlies the base. The rim and tire are so proportioned with respect to each other that the metal band in combination with the tapered surfaces of the rim flanges form a confining chamber for the base of the tire thereby preventing undesirable flow of the base stock and thereby preventing breakdown of the bond between the reinforcement and the rubber forming the tire. As none of the force exerted on the base stock by the tapered flanges of the rim is dissipated by undesired flow of the base stock, the inner diameter of the tire need be made only slightly smaller than that of the rim in order to provide sufficient force to prevent slippage of the tire on the rim. All pressure exerted on the reinforcing band by the base stock serves to increase the effectiveness of the bond between the band and the base stock.

Apart from the functional advantages obtained by the construction of the present invention, certain advantages in fabrication are obtained, as the metal band provides a base on which the tire can be readily built. The base, cushion and tread stock may be extruded as strips and applied to the metal band with suitable adhesives, and bonded thereto during vulcanization.

Other objects and advantages of the present invention will become apparent from the following description when read in conjunction with the following drawings wherein:

Fig. 1 is an elevational view of the tire and rim assembly of the present invention;

Fig. 2 is a sectional perspective view of a portion of the tire and rim assembly of the present invention showing the details thereof;

Fig. 4 is a sectional perspective view of a portion of the reinforcing band for the tire showing the layers of adhesive applied thereto to effect bonding of the overlying rubber layers thereto during vulcanization.

Figure 3:
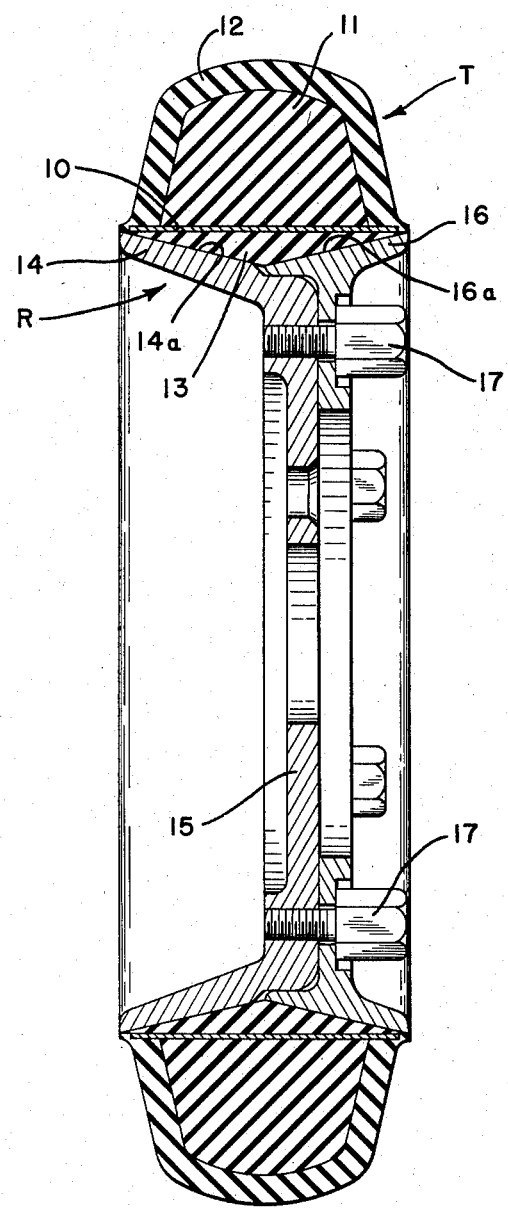
Fig. 3 is a sectional view taken on the line III—III of Fig. 1.

Referring to the drawings, and in particular to Figs. 2 and 3, the tire T of the present invention includes a continuous, unbroken, annular metal band 10, a layer 11 of resilient rubber cushion stock bonded to the outer surface of the band 10, a generally U-shaped cover 12 of tough, abrasion resistant stock bonded to the cushion stock and to the band 10 at its marginal edges, and a resilient rubber base strip 13 bonded to the inner surface of the band 10.

The band 10 is of substantially the same width as the base strip 13 and the base strip 13 is tapered inwardly from substantially zero thickness at the marginal edges thereof to a substantial thickness at the center thereof. A taper of from 8° to 17° as measured from a transverse plane through the cross-section of the tire has been found to be satisfactory. The cover 12 and the base strip 13 are preferably of slightly greater width, about 1/8 inch, than the band 10 so that their lateral edges may be bonded together to thereby seal the lateral edges of the band 10 against moisture.

As best shown in Fig. 3, the rim R on which the tire is mounted includes, a tapered flange 14, forming an integral part of a wheel 15 and a removable, oppositely tapered flange 16 which is clamped to the wheel by bolts 17. The tire T is demounted from the rim R by removing bolts 17 and flanges 16. The taper of the tire seating surfaces 14a and 16a of the flanges 14 and 16 substantially correspond to that of the base strip 13.

The maximum projected width of the tire seating surfaces 14a and 16a is not less than the width of the metal band 10 and the diameter of the metal band 10 at the lateral edges thereof is not substantially greater than the maximum diameter of the seating surfaces 14a and 16a, so that when the tire is mounted on the rim of the wheel, the band 10 in combination with the seating surfaces 14a and 16a form a confining chamber for the base strip 13 as shown in Figs. 2 and 3.

The inner diameter of the tire at any given point, when unmounted, is slightly less than the diameter of the seating surfaces 14a and 16a of the rim flanges 14 and 16 at corresponding points so that when the tire is mounted thereon, the base strip 13 is subjected to radially directed forces as the flange 16 is clamped in place by the bolts 17. The substantially inextensible metal band 10, overlying the base strip 13, prevents the tire from stretching circumferentially and substantially all the force applied to the base strip 13 is effective in providing a gripping action between the base strip and the seating surfaces 14a and 16a to thereby prevent slippage of the tire on the rim when the assembly is in use. The confinement of the base strip 13 between the band 10 and the seating surfaces 14a and 16a prevents undesirable flow of the stock of the base strip 13, as would occur if the band 10 were perforated or if reinforcement in the form of spaced metal cables or bands were used.

The metal band 10 is formed of a strip of metal of the desired width which has been rolled into cylindrical form and the ends thereof butt-welded. An SAE 1010 or 1020, hot or cold rolled steel of about ⅛ of an inch thickness, has been found to be quite satisfactory for the band.

The cover 12 may be made from any suitable wear-resistant stock. A wear-resistant natural rubber stock or synthetic rubber stock, having a Shore durometer hardness within the range of from 30 to 90 (measured on the A scale) has been found to be particularly useful for this purpose. Reclaim rubber, and various artificial or substitute rubbers or plastics of sufficient toughness and resiliency may be used if desired.

The cushion layer 11 is preferably a resilient stock, preferably composed of vulcanized rubber stock having a Shore durometer hardness which is in the range of from 30 to 75 (measured on the A scale), or any other elastic material of similar properties. The cushion layer forms a core capable of absorbing shocks caused by irregularities in the floor or road. The base strip 13 may be made of any suitable soft, resilient rubber stock.

The tire may be easily fabricated by any conventional method such as extruding the cover, cushion layer and base strips in the form of elongated strips and applying them to the band 10 with suitable adhesives to effect a bond therebetween during subsequent vulcanization. Any conventional method of bonding can be used. A very suitable bond has been obtained by first carefully cleaning the surfaces of the metal band 10, applying a coat of metal-to-rubber adhesive (such as described in U.S. Patents Nos. 2,139,992, 2,147,620 and 2,259,190), to the cleaned surfaces, applying a coat of rubber cement on the top of the adhesive, superimposing the various layers of cover, cushion, and base stock on the metal band, and then vulcanizing the assembly in a vulcanizing mold in the conventional manner. The relative positions of the rubber-to-metal adhesive and the rubber cement are illustrated in Fig. 4; the layer of metal to rubber adhesive being indicated by the reference numeral 18 and the layer of rubber cement by the reference numeral 19.

From the above description, it can be seen that there is provided a tire of novel construction which when mounted on a rim of a particular shape and size will give superior performance and be less subject to failure due to separation of the rubber stock and the reinforcement than tires of this type heretofore proposed. This superior performance is obtained by confining or immobilizing the base strip between the metal band 10 and the tapered seating surfaces 13a and 15a of the tire rim. While a particular form of the invention has been shown and described, it is to be understood that variations can be made therein without departing from the spirit and scope of the invention. For example, the outer portion of the tire corresponding to the cover 12 and cushion stock 11 may be made as a single unit formed of a single stock. Such a stock would be selected as a compromise between best wear-resistance and best cushioning characteristics. The outer portion of the tire may be provided with transverse openings therethrough or with a circumferentially extending annular chamber to provide additional cushioning effect. Such variations are well known to those skilled in the art and are generally shown in U.S. Patent Nos. 906,569, 1,670,827 and 1,639,175. Other variations in the shape and design of the outer portion of the tire may be made as desired.

The term rubber is used herein in its generic sense to include natural rubber, synthetic rubber, or plastics exhibiting rubber-like characteristics and blends thereof.

Having thus described our invention, what we claim and desire to protect by Letters Patent is:

1. A tire and rim assembly comprising, a rim having a pair of flanges, providing a pair of oppositely tapered tire seating surfaces, one of said flanges being removably clamped to the other to permit mounting and demounting of a tire thereon, a tire seated on said tire seating surfaces, said tire having a base of resilient rubber tapered inwardly from the marginal edges thereof and engaging said tapered seating surfaces, the inner diameter of said base when said tire is unmounted being less than the diameter of said flanges at corresponding points thereof so that radially directed forces are applied to said base by said seating surfaces when the tire is mounted on said rim, an inextensible solid annular band surrounding said base and bonded thereto to prevent circumferential stretching of the tire, said band being of substantially the same width as said base and of a diameter at the marginal edges thereof substantially equal to the maximum diameter of the tapered tire seating surfaces of the rim so that said base is confined between said band and said tire seating surfaces of said flanges, and an annular outer ring of cushion stock bonded to the outer surface of said band.

2. A tire for use on a rim of the split type having tire seating surfaces inwardly tapered from the marginal edges thereof comprising, a base of resilient rubber tapered inwardly from the marginal edges thereof to provide tapered surfaces engageable with the tapered seating surfaces of the rim, an inextensible solid band surrounding said base and bonded thereto, said band having a width substantially equal to the width of said base and of a diameter at the marginal edges thereof substantially equal to the maximum diameter of the tapered tire seating surfaces of the rim and serving in conjunction with said tapered seating surfaces of the rim when the tire is mounted thereon to confine said base and prevent undesirable flow of the stock of said base under the influence of forces applied thereto when the tire is mounted on said rim, and an annular ring of cushion stock secured to the outer surface of said band.

References Cited in the file of this patent

UNITED STATES PATENTS

| | | |
|---|---|---|
| 1,544,639 | Fowler | July 7, 1925 |
| 2,525,196 | Bacon | Oct. 10, 1950 |
| 2,701,971 | Carter et al. | Feb. 15, 1955 |
| 2,764,213 | Simpson | Sept. 25, 1956 |

FOREIGN PATENTS

| | | |
|---|---|---|
| 24,406 | Great Britain | 1905 |